(12) United States Patent
Friedman et al.

(10) Patent No.: US 11,011,283 B2
(45) Date of Patent: May 18, 2021

(54) EASY CLEAN CABLE

(71) Applicant: General Cable Technologies Corporation, Highland Heights, KY (US)

(72) Inventors: Samuel Friedman, East Greenwich, RI (US); Alben D. Roland, Providence, RI (US); Xi Zhang, Carmel, IN (US); Srinivas Siripurapu, Carmel, IN (US); Vijay Mhetar, Carmel, IN (US); Subramanya Kishore Avadhanula Venkata, Navi Mumbai (IN)

(73) Assignee: General Cable Technologies Corporation, Highland Heights, KY (US)

( * ) Notice: Subject to any disclaimer, the term of this patent is extended or adjusted under 35 U.S.C. 154(b) by 1001 days.

(21) Appl. No.: 14/209,613

(22) Filed: Mar. 13, 2014

(65) Prior Publication Data
US 2014/0329088 A1 Nov. 6, 2014

Related U.S. Application Data

(60) Provisional application No. 61/794,611, filed on Mar. 15, 2013.

(51) Int. Cl.
*H01B 3/20* (2006.01)
*H01B 3/30* (2006.01)
(Continued)

(52) U.S. Cl.
CPC ............... *H01B 3/20* (2013.01); *G02B 6/443* (2013.01); *G02B 6/4486* (2013.01); *H01B 3/302* (2013.01);
(Continued)

(58) Field of Classification Search
CPC . H01B 3/20; H01B 3/302; H01B 3/40; H01B 3/44; H01B 7/17; H01B 13/322;
(Continued)

(56) References Cited

U.S. PATENT DOCUMENTS 3,928,210 A    12/1975   Peterson
4,458,986 A *   7/1984   Yuto .................. G02B 6/02033
                                                                         385/103
(Continued)

FOREIGN PATENT DOCUMENTS

CN          101570610 A     11/2009
DE      102005032616 A1     1/2007
(Continued)

OTHER PUBLICATIONS

Marsitzky, Dirk; Extended European Search Report, including the supplementary European Search Report and the European Search Opinion, issued in European Patent Application No. EP14764559.2; dated Sep. 14, 2016; 5 pages.
(Continued)

*Primary Examiner* — Scott R. Walshon
(74) *Attorney, Agent, or Firm* — Ulmer & Berne LLP (57) ABSTRACT

Cables having a conductor with a polymeric covering layer and a non-extruded coating layer made of a material based on a liquid composition including a polymer resin and a fatty acid amide. Methods of making cables are also provided.

27 Claims, 7 Drawing Sheets

(51) Int. Cl.
  *H01B 3/40* (2006.01)
  *G02B 6/44* (2006.01)
  *H01B 3/44* (2006.01)
  *H01B 7/17* (2006.01)
  *H01B 13/32* (2006.01)

(52) U.S. Cl.
  CPC .............. *H01B 3/40* (2013.01); *H01B 3/44* (2013.01); *H01B 7/17* (2013.01); *H01B 13/322* (2013.01); *Y10T 428/2933* (2015.01)

(58) Field of Classification Search
  CPC .. G02B 6/443; G02B 6/4486; Y10T 428/2933
  See application file for complete search history.

(56) References Cited

U.S. PATENT DOCUMENTS

| | | | |
|---|---|---|---|
| 4,818,438 A | | 4/1989 | Wiley |
| 5,138,685 A | | 8/1992 | Arroyo et al. |
| 5,333,620 A | | 8/1994 | Moutafis et al. |
| 5,420,185 A | | 5/1995 | Watanabe et al. |
| 5,722,424 A | | 3/1998 | Engelson |
| 5,824,413 A | * | 10/1998 | Schell ............... C03C 25/26 428/378 |
| 5,827,612 A | * | 10/1998 | Girgis ............... C03C 25/28 427/407.1 |
| 5,894,042 A | | 4/1999 | Ferralli |
| 5,912,436 A | | 6/1999 | Sanchez et al. |
| 6,224,579 B1 | | 5/2001 | Modak et al. |
| 6,291,772 B1 | * | 9/2001 | Easter ............... H01B 1/24 174/102 SC |
| 6,416,813 B1 | | 7/2002 | Valls Prats |
| 6,485,735 B1 | | 11/2002 | Steen et al. |
| 6,638,617 B2 | * | 10/2003 | Kim ............... H01B 1/12 174/120 SR |
| 6,858,296 B1 | * | 2/2005 | Mendelsohn ......... H01B 1/24 174/110 PM |
| 7,008,979 B2 | | 3/2006 | Schottman et al. |
| 7,494,474 B2 | | 2/2009 | Richardson |
| 7,772,492 B2 | | 8/2010 | Parsons et al. |
| 9,087,629 B2 | | 7/2015 | Bates |
| 2004/0151906 A1 | * | 8/2004 | Pinto ............... G02B 6/4436 428/375 |
| 2006/0006808 A1 | | 1/2006 | Smith et al. |
| 2006/0068085 A1 | | 3/2006 | Reece et al. |
| 2007/0275101 A1 | | 11/2007 | Lu et al. |
| 2010/0016890 A1 | | 1/2010 | Tsai et al. |
| 2010/0210745 A1 | | 8/2010 | McDaniel et al. |
| 2010/0236811 A1 | | 9/2010 | Sasse et al. |
| 2011/0011614 A1 | | 1/2011 | Brown, Jr. et al. |
| 2011/0268974 A1 | | 11/2011 | Ganguli et al. |
| 2012/0176858 A1 | | 7/2012 | Stenzel et al. |
| 2013/0220667 A1 | | 8/2013 | Millan Perez et al. |
| 2014/0262427 A1 | | 9/2014 | Brown et al. |
| 2014/0272115 A1 | | 9/2014 | Shaffer et al. |
| 2014/0329088 A1 | | 11/2014 | Friedman et al. |
| 2015/0090475 A1 | | 4/2015 | Ranganathan et al. |

FOREIGN PATENT DOCUMENTS

| | | |
|---|---|---|
| GB | 2464610 A | 4/2010 |
| JP | 63-168912 A | 7/1988 |
| JP | 63-278953 A | 11/1988 |
| JP | 63-289719 A | 11/1988 |
| JP | 64-603 A | 1/1989 |
| JP | 3-158806 A | 7/1991 |
| JP | 4-177304 A | 6/1992 |
| JP | 4-306508 A | 10/1992 |
| JP | 4-357623 A | 12/1992 |
| JP | 10-292189 A | 11/1998 |
| JP | 11-49911 A | 2/1999 |
| JP | 11-191321 A | 7/1999 |
| JP | 11-199732 A | 7/1999 |
| JP | 2003-295017 A | 10/2003 |
| JP | 2005-187758 A | 7/2005 |
| JP | 4934469 B2 | 5/2012 |
| KR | 10-2007-0043308 A | 4/2007 |
| WO | 2006016896 A1 | 2/2006 |
| WO | 2009004246 A2 | 1/2009 |
| WO | 2010142917 A1 | 12/2010 |

OTHER PUBLICATIONS

Kim, Seung Beom; International Search Report and Written Opinion of the International Searching Authority, issued in International Application No. PCT/US2014/028896; dated Jul. 1, 2014; 12 pages.
Office Action issued in ROC (Taiwan) Patent Application No. 103109777; dated Dec. 24, 2015; 10 pages, including English translation.
Nieto, Edmundo Codina; Examination Report on Patent Application, issued in Chilean Patent Application No. 201502451; dated Dec. 14, 2016; 11 pages, including English translation.
Database WPI, Week 199133; Thomson Scientific, London, GB; AN 1991-242837, XP-002782736, and JPH03158806 A (Nippon Denshi Zairyo KK) Jul. 8, 1991, abstract; 1 page.
Marsitzky, Dirk; Extended European Search Report, including the supplementary European search report and the European search opinion, issued in European Patent Application No. 14907924.6; dated Jul. 11, 2018; 6 pages.
Walshon, Scott R.; Non-Final Office Action issued in U.S. Appl. No. 14/563,351; dated Sep. 8, 2017; 21 pages.
Walshon, Scott R.; Final Office Action issued in U.S. Appl. No. 14/563,351; dated May 15, 2018; 11 pages.
Andrade Meneses, Ociel Esau; Office Action issued in Mexican Patent Application No. MX/a/2015/011419; dated Sep. 10, 2019; 6 pages including partial English machine translation.
Marsitzky, Dirk; Office Action issued in European Patent Application No. 14764559.2; dated Oct. 10, 2019; 3 pages.
Da Silva, Gilson; Office Action issued in Brazilian Patent Application No. BR112015022954-9; dated Oct. 16, 2019; 6 pages, including English translation.
Stuart, Laura; Office Action issued in Canadian Patent Application No. 2,902,208; dated Mar. 26, 2019; 4 pages.

* cited by examiner

EASY CLEAN CABLE

CROSS-REFERENCE TO RELATED APPLICATION

The present application claims priority of U.S. provisional application Ser. No. 61/794,611, filed Mar. 15, 2013, and hereby incorporates the same application herein by reference in its entirety.

TECHNICAL FIELD

The present disclosure relates to cover (insulation or jacket) compositions for wires or cables having a coating thereon that enables the cable cover to be easily cleaned and free of dirt.

BACKGROUND

Cables, particularly those used outdoor, tend to attract and to pick up dirt and contaminants that adhere to the cable. That is especially true when the cable is moved frequently by being dragged on the ground, such as charging cables for boats and yachts. The cable, overtime, accumulates dirt and contaminants on its outer surface and is rendered unsightly, but is difficult to clean without scuffing and/or destroying the surface of the covering. Scuffing of the covering generally exacerbates the problem by making the cable more attractive to dirt and contaminants.

Therefore, there remains a need for a cable that is resistant to dirt and contaminants, and whose outer surface can easily be cleaned without scuffing and/or damaging the covering.

SUMMARY

In accordance with one embodiment, a cable includes a conductor, a polymeric covering layer and a non-extruded coating layer made of a material based on a liquid composition. The liquid composition includes a polymer resin and a fatty acid amide.

In accordance with another embodiment, a method of making a cable includes providing a conductor covered with a covering layer, coating an outer surface of the covering layer with a liquid composition and curing a liquid polymer resin. The liquid composition includes a polymer resin and a fatty acid amide.

DETAILED DESCRIPTION

The present disclosure provides a cable that is resistant to dirt and contaminants and is capable of being easily cleaned without damaging the cable covering. The present disclosure provides a cable including a conductor or a cabled core, a covering (jacket or insulation), and a coating layer surrounding the covering. The coating layer can be made of a material based on a liquid composition containing a polymer resin and a fatty acid amide. In one embodiment, the polymer resin can be a urethane composition. In another embodiment, the polymer resin can be an epoxy composition. The coating layer is not an extruded layer, because the polymer resin liquid composition is not amenable to extrusion due to its low viscosity. Such cables can have a diameter of about 6 mm to about 40 mm.

The present disclosure also provides a method of making a cable that is capable of being easily cleaned without damaging the cable covering. A conductor can first be covered with a covering layer made of polymeric material. The covering can generally be used in the art as a cable jacket and/or an insulation layer. The covering can then be coated, particularly on its outer surface, with a coating layer made of a polymer resin liquid and a fatty acid amide.

Figure 1:
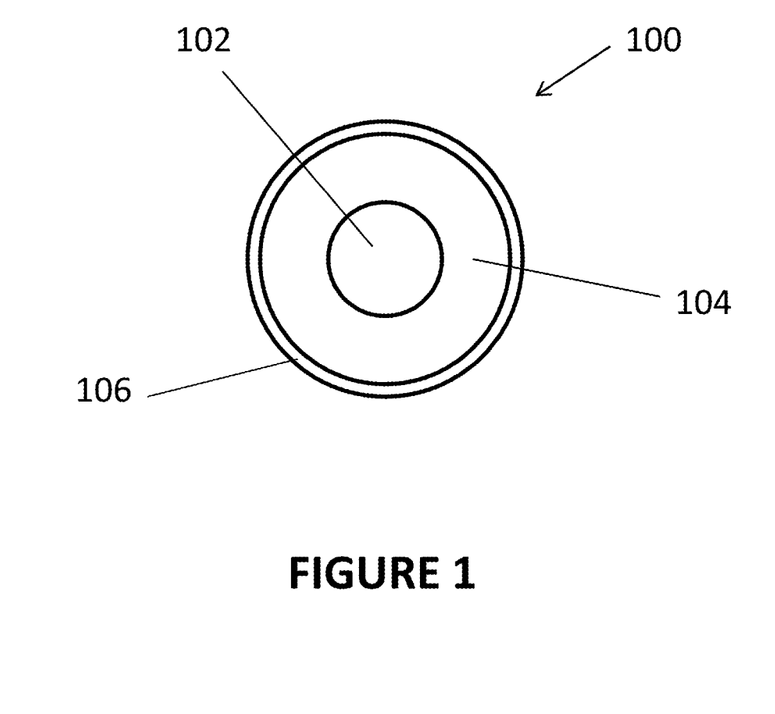
FIG. 1 is a cross-section of one embodiment of the present disclosure.

FIG. 1 shows one embodiment of the present disclosure. In that embodiment, the cable 100 includes a conductor 102, an insulation 104 covering the conductor 102, and a coating layer 106. The coating layer 106 can allow the cable to be cleaned without damaging the insulation 104.

Figure 2:
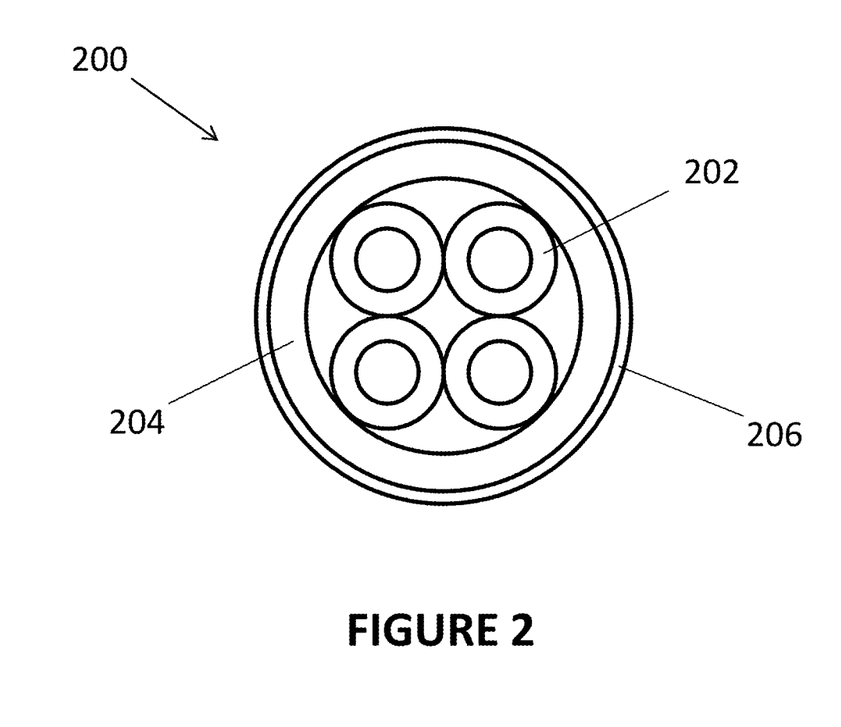
FIG. 2 is a cross-section of another embodiment of the present disclosure.

FIG. 2 show another embodiment of the present disclosure. In that embodiment, the cable 200 includes a plurality of insulated conductors 202 which can be covered with a jacket 204. The outer layer of the jacket 204 can be coated with a coating layer 206, which allows the cable to be cleaned without damaging the jacket 204.

In certain embodiments, a conductor can be an optical conductor or an electrical conductor. The optical conductor, can be, e.g. an optical fiber known in the art. The electrical conductor can be, e.g. a copper or aluminum conductor known in the art.

The covering can be any insulation or jacket generally used in the art. The covering can have a polymer base that can be a rubber or a polyolefin. Polyolefins can include polyethylene (such as low-density (LDPE), high-density, high molecular weight (HDPE), ultra-high molecular weight (UHDPE), linear-low-density (LLDPE), very-low density, etc.), maleated polypropylene, polypropylene, polybutylene, polyhexalene, polyoctene, and copolymers thereof, and ethylene-vinyl-acetate (EVA) copolymer, and mixtures, blends or alloys thereof. Covering polymers for the present disclosure can also include thermoplastic elastomers (TPE), neoprenes, chlorinated polyethylenes (CPE), ethylene-propylene-diene ter-polymer (EPDM), nitrile butadiene rubber/polyvinyl chloride (NBR/PVC), or combinations thereof. Suitable examples of compositions for the covering can be those as follows:

1) For CPE

| | |
|---|---|
| Polymer | 100 parts |
| Plasticizer | 40 parts |
| Mineral Fillers | 50 parts |
| Cure package | 5 parts |
| Other (flame retardants, co-agents, process aids, color) | 30 parts |

2) For EPDM

| | |
|---|---|
| Polymer | 100 parts |
| Plasticizer | 70 parts |
| Mineral Fillers | 100 parts |

-continued

| | |
|---|---|
| Cure package | 5 parts |
| Other (co-agents, process aids, color) | 25 parts |

3) For NBR/PVC

| | |
|---|---|
| Polymer | 100 parts |
| Plasticizer | 20 parts |
| Mineral Fillers | 60 parts |
| Cure package | 5 parts |
| Other (flame retardants, process aids, color) | 50 parts |

4) For neoprene

| | |
|---|---|
| Polymer | 100 parts |
| Plasticizer | 15 parts |
| Mineral Fillers | 80 parts |
| Cure package | 5 part |
| Other (flame retardants, process aids, color) | 50 parts |

In addition to the base polymer, the covering can include other additives known in the art, including but not limited to, flame retardants, fillers, antioxidants, processing aids, colorants, and stabilizers.

A coating can be made of a material based on liquid composition including a polymer resin and a primary or secondary fatty acid amide. Because a liquid composition can have a relatively low viscosity, the coating is not extruded. Rather, the coating layer can be applied by painted, sprayed, or dip processes as detailed below. A liquid coating material can include a polymer resin, a fatty acid amide, and a solvent. The fatty acid amide can be present at an amount of about 5% or less (by weight of the liquid coating composition), in certain embodiments, from about 0.5% to about 5%. The fatty acid amide can be dispersed in the resin and solvent, e.g. using techniques known in the art. Such solvents can include a mixture or a single solvent. Suitable solvents can include water and/or N-methyl pyrrolidone, with a water based emulsion system. The liquid composition can also include dispersants, anti-settling aids, wetting agents, UV stabilizers, heat stabilizers, surfactants, and/or combinations thereof. The solid content of the liquid composition can be about 25% to about 60% (by weight of the total liquid composition) in one embodiment, in certain embodiments, about 30% to about 65%, and in certain embodiments about 35% to about 50%.

In one embodiment, the polymer resin can be a urethane liquid composition, and in certain embodiments a water based urethane composition. Either two parts or single urethane compositions can be appropriate for the present disclosure. Single part compositions can be easy to use. Two part systems can generally include a first part that includes the resin and a second part that includes a curing agent. When the two parts are mixed, the composition can be cured to form a thermoset. The single part systems can be easier to use because no mixing of ingredients is needed. The composition can simply be applied without any premixing or preparation. A coating can be based on a single part, water based urethane resin.

In addition to the polymer resin, the coating composition can also include a fatty acid amide, including primary and secondary fatty acid amides. The fatty acid amide can include molecules where the fatty group of the fatty acids is $C_{11}$ to $C_{21}$ alkyl or alkenyl. Examples of the fatty acid amide include, but are not limited to, oleamide, erucamide, stearamide, behenamide, oleyl palmitamide, stearyl erucamide, ethylene-bis-stearamide, or ethylene-bis-oleamide. In one embodiment, a fatty acid amide can be ethylene-bis-stearamide.

The covering layer can be applied onto the cable using methods known in the art. Usually, a covering layer can be extruded onto a bare conductor to form an insulation layer, or onto at least one insulated conductor to form a jacket. Extrusion methods for applying the covering layer are well-known in the art.

The coating mixture can be applied to the outer surface of the covering layer, either directly or after the surface has been prepared. Preparation may include cleaning the outer surface of the covering or treating that surface to improve the adhesion of the coating. The preparation can be as simple as cleaning with soap and water to corona treatment or flame treatment. A cover can be wiped with isopropyl alcohol, dried, and heated. IN certain embodiments, the heating can take place in an oven heated to about 90° C. to about 200° C. for about 1 second to about 1 minute, in certain embodiments about 2 seconds to about 30 seconds, and in certain embodiments about 3 seconds to about 10 seconds.

In an embodiment, a coating mixture composition can be applied by spraying. A spray gun can be used with 10-45 psi pressure, and controlled through air pressure. The spray gun nozzle can be placed at opposite direction of the conductor (at approximately 90° angle) to get a uniform coating on conductor product. In certain cases, two or more guns can be used to get more efficient coatings. The coating thickness can be controlled by the admixture viscosity, gun pressure, and conductor line speed. During the coating application, the temperature can be maintained at about room temperature depending on the material of the covering and/or of the coating.

Alternatively, the coating can be applied to the covered cable by dipping or painting. Here, the covered cable can be dipped into the liquid coating mixture to allow the mixture to completely coat the conductor. The cable can then be removed from the coating mixture and cured. In painting, the liquid coating mixture can be painted on to the outer surface of the covering layer using a brush or a roller.

After application, the coating can be dried/cured either at room temperature or at elevated temperatures up to 320° C., in certain embodiments from about 200° C. to about 320° C., and in certain embodiments from about 240° C. to about 260° C., for about 10 seconds to about 60 minutes, in certain embodiments from about 10 seconds to about 15 minutes, and in certain embodiments from about 10 seconds to about 3 minutes. Curing/drying can be on-line and/or off-line. In certain embodiments, on-line curing is sufficient to achieve a tack-free coating.

The coating process can be automated with robotic systems. The automated process can function in three steps: 1) preparing the outer surface of the covering layer; 2) applying the coating layer on the outer surface of the covering layer; and 3) curing the coating layer. The coating process can be batch, semi-batch, or continuous, with continuous being especially effective for automation. The line speed of the continuous coating process can be 10-750 feet/minute in certain embodiments, in certain embodiments about 300-600 feet/minute, and in certain embodiments about 400-500 feet/minute.

Once completely dried/cured, the coating layer can have a thickness of about 2 mils or less in certain embodiments, in certain embodiments about 1 mil or less, and in certain embodiments about 0.5 mil or less. The dried/cured coating layer can also contain about 15% or less of fatty acid amide (by weight of the dried/cured coating) in certain embodiments, in certain embodiments about 2% to about 15%, and in certain embodiments about 5% to about 15%. That concentration can be much higher than that of the liquid coating composition due to evaporation of the volatile components during the drying/curing process.

The coating layer can allow the cable to be easily cleaned without damaging the covering layer. The coating layer can also render the cable more resistant to dirt and contamination.

Without further description, it is believed that one of ordinary skill in the art can, using the preceding description and the following illustrative example, make and utilize the compounds of the present disclosure and practice the claimed methods. The following example is given to illustrate the present disclosure. It should be understood that the disclosure is not to be limited to the specific conditions or details described in this example.

EXAMPLE

Wire samples (16AWG Wire PE 31.13.000605) were used in the testing with different coating compositions.

Coating Procedure: A 10" portion of wire was heated for 2 minutes at 450° F. (about 232° C.), and then coating was applied by wiping with a sponge brush.

Curing Procedure: A heat gun was applied for 2 minutes until sample was dry and not tacky.

Coating quality check: Manual bend over a mandrel having the same size as the diameter of the cable. There must be no cracking or delamination for the cable to be tested.

Test Procedure:

The simulated dirt composition contains N660 carbon black. The cable was dipped into a tray containing the simulated dirt and rolled to coat all sides. The cable is then removed from the tray and the excess simulated dirt is shaken off. The sample is then allowed to rest for 10 minutes before cleaning. The cleaning procedure involved rinsing the sample cable under running water for 1 min, followed by a soap and water wash. Pictures were taken of the cable before the test procedure and after the test procedure.

Figure 3:
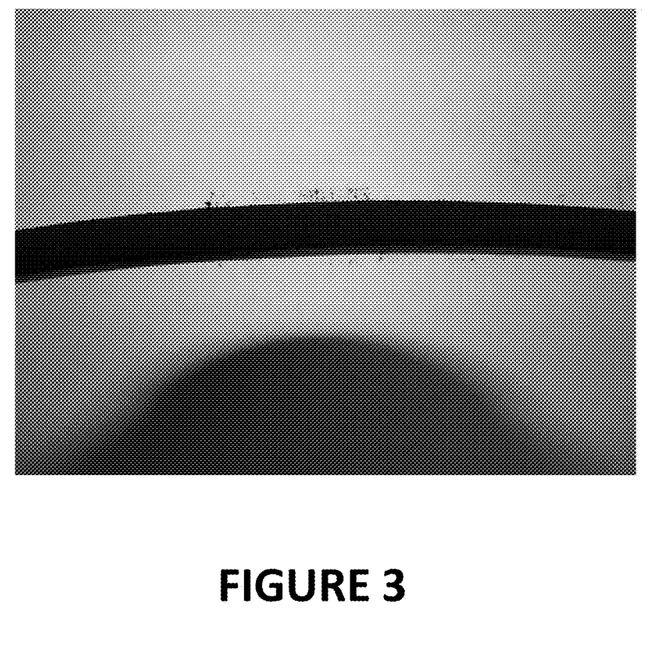
FIG. 3 is a photograph showing a cable that has been dipped in simulated dirt, but has not been cleaned.

FIG. 3 shows the cable after being dipped into the simulated dirt and before cleaning.

Figure 4:
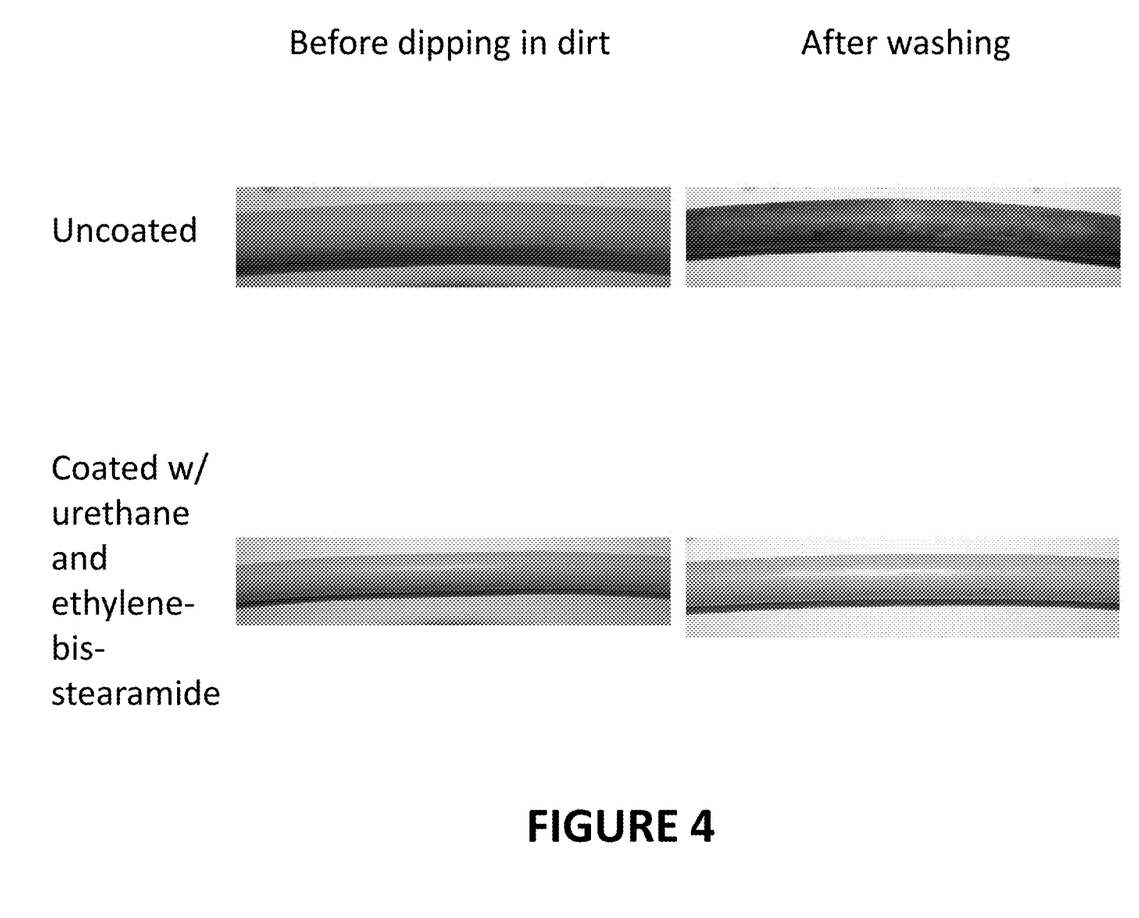
FIG. 4 are photographs showing a comparison between an uncoated cable and a cable coating with one composition of the present disclosure.

FIG. 4 shows a comparison of the clean ability of an uncoated cable with a cable coated with an aqueous liquid suspension of urethane and ethylene-bis-stearamide (5% by weight of the liquid composition).

Figure 5A:
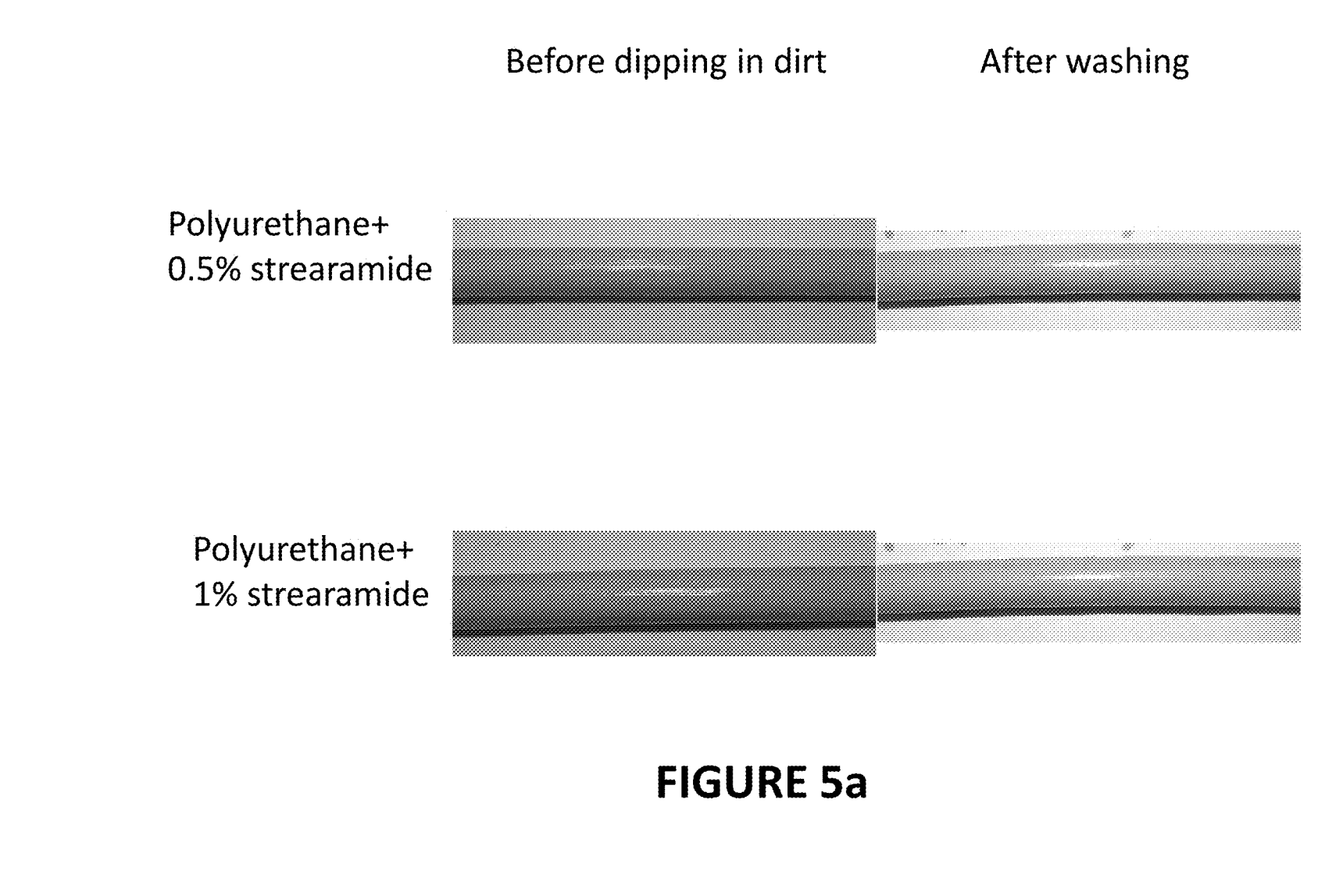
FIGS. 5a to 5c are photographs showing a comparison between different concentrations of strearamide in the liquid coating composition.
Figure 5B:
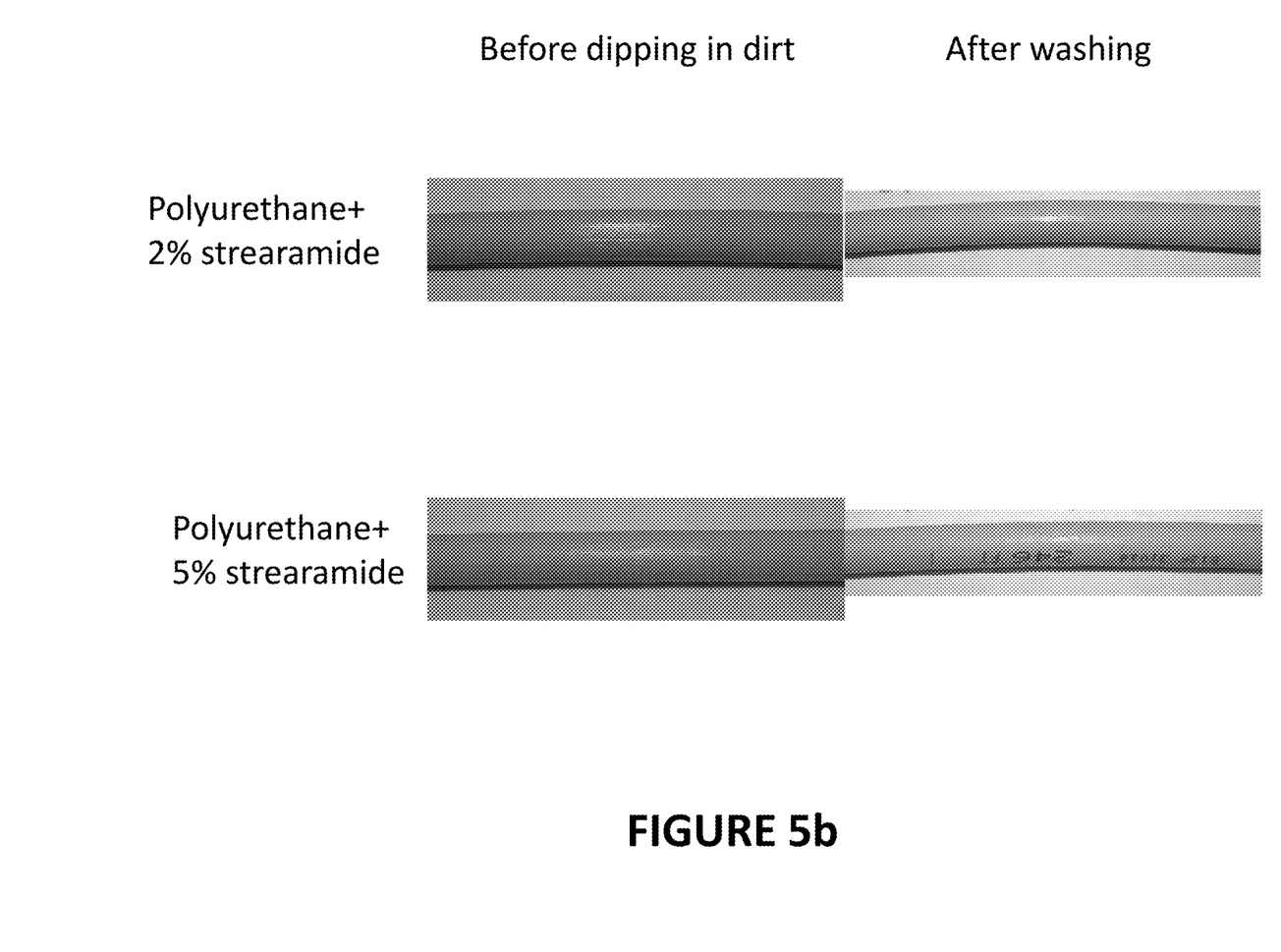
Figure 5C:
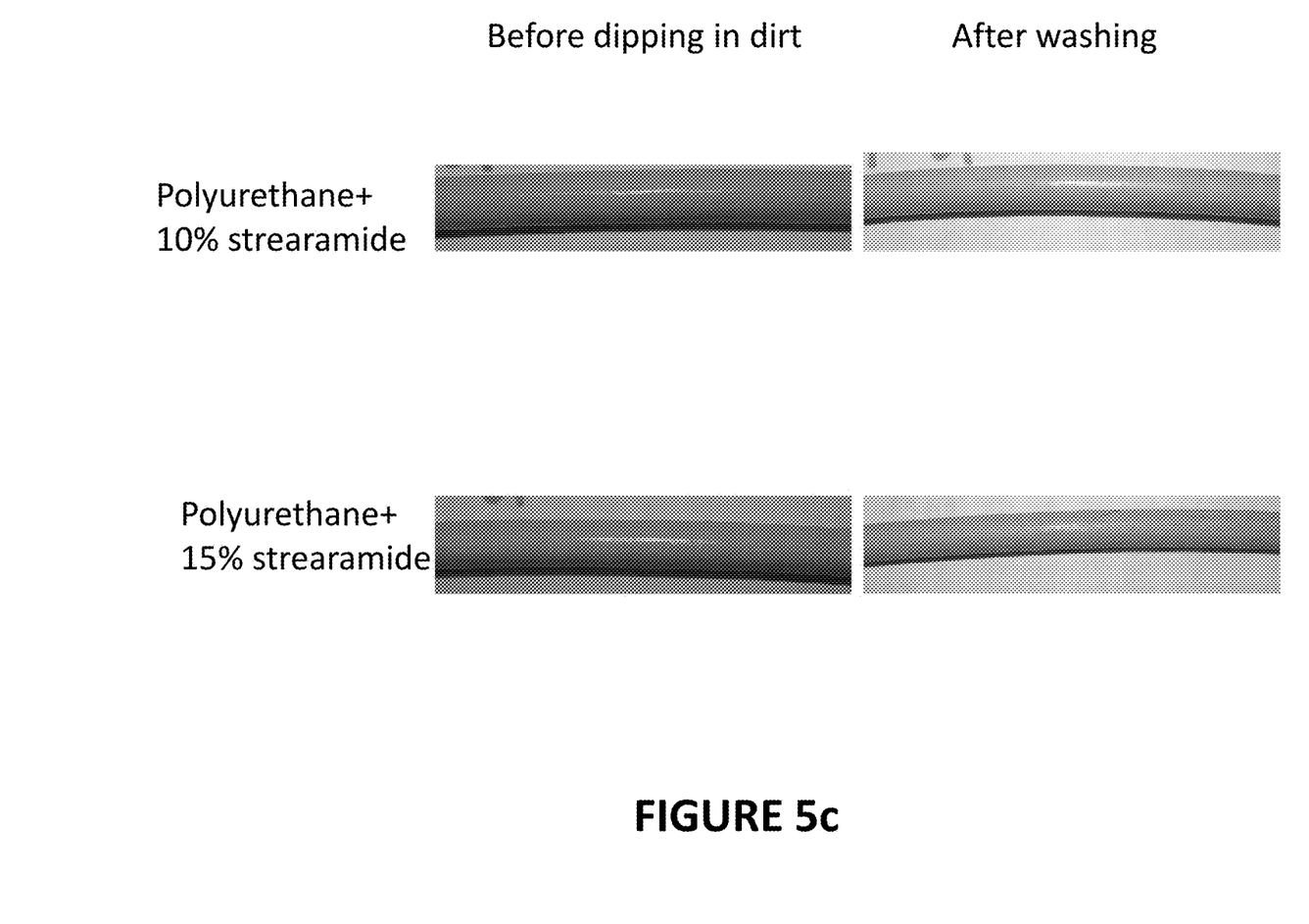

FIGS. 5a-5c shows the effect to different concentrations of stearamide (0.5%, 1%, 2%, 5%, 10%, and 15%) on the compositions. The percentage of stearamide shown is the concentration by weight of strearamide based on the total aqueous liquid coating composition. Above about 5%, the surface of the cable appears rough.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A cable comprising:
   a. one or more conductors;
   b. a polymeric covering layer; and
   c. a non-extruded coating layer made of a material based on a liquid composition, the liquid composition comprising a polymer resin and a fatty acid amide, wherein the polymer resin comprises an epoxy or urethane, wherein the non-extruded coating layer is applied to an outer surface of the polymeric covering layer, and wherein the non-extruded coating layer is the outermost layer of the cable.

2. The cable of claim 1, wherein the one or more conductors comprise an optical conductor or an electrical conductor.

3. The cable of claim 1, wherein the covering layer comprises polyethylene, low-density polyethylene, high-density polyethylene, high molecular weight polyethylene, ultra-high molecular weight polyethylene, linear-low-density polyethylene, very-low density polyethylene, maleated polypropylene, polypropylene, polybutylene, polyhexalene, polyoctene, ethylene-vinyl-acetate copolymer, thermoplastic elastomers, neoprenes, chlorinated polyethylenes, ethylene-propylene-diene ter-polymer, nitrile butadiene rubber/polyvinyl chloride, or copolymers or blends thereof.

4. The cable of claim 1, wherein the fatty acid amide comprises oleamide, erucamide, stearamide, behenamide, oleyl palmitamide, stearyl erucamide, ethylene-bis-stearamide, or ethylene-bis-oleamide.

5. The cable of claim 1, wherein the non-extruded coating layer has a thickness of about 5 mils or less.

6. The cable of claim 1, wherein the non-extruded coating layer comprises about 5% or less, by weight, of the fatty acid amide.

7. The cable of claim 1, wherein the polymer resin is cured.

8. The cable of claim 1, wherein the polymeric covering layer is an insulation layer or a jacket layer for the cable.

9. The cable of claim 1, wherein the polymeric covering layer surrounds the one or more conductors.

10. The cable of claim 1, wherein the one or more conductors comprise a plurality of insulated conductors.

11. The cable of claim 10, wherein the polymeric covering layer surrounds the plurality of insulated conductors.

12. The cable of claim 1, wherein the liquid composition further comprises a solvent.

13. A method of making the cable of claim 1, the method comprising:
   a. providing one or more conductors covered with a polymeric covering layer;
   b. coating an outer surface of the polymeric covering layer with a liquid composition, the liquid composition comprising a polymer resin and a fatty acid amide; wherein the polymer resin comprises an epoxy or urethane; and
   c. curing the liquid polymer resin.

14. The method of claim 13, wherein the one or more conductors comprise an optical conductor or an electrical conductor.

15. The method of claim 13, wherein the polymeric covering layer comprises polyethylene, low-density polyethylene, high-density polyethylene, high molecular weight polyethylene, ultra-high molecular weight polyethylene, linear-low-density polyethylene, very-low density polyethylene, maleated polypropylene, polypropylene, polybutylene, polyhexalene, polyoctene, ethylene-vinyl-acetate copolymer, thermoplastic elastomers, neoprenes, chlorinated polyethylenes, ethylene-propyl ene-di ene ter-polymer, nitrile butadiene rubber/polyvinyl chloride, or copolymers or blends thereof.

16. The method of claim 13, wherein the fatty acid amide comprises oleamide, erucamide, stearamide, behenamide, oleyl palmitamide, stearyl erucamide, ethylene-bis-stearamide, or ethylene-bis-oleamide.

17. The method of claim 13, wherein the liquid composition further comprises a solvent.

18. The method of claim 13, wherein the liquid composition comprises about 5% or less, by weight, of the fatty acid amide.

19. The method of claim 13, wherein coating of the outer surface of the polymeric covering layer is accomplished by spraying, dipping, or painting.

20. The method of claim 13, wherein coating of the outer surface of the polymeric covering layer occurs at room temperature.

21. The method of claim 13, wherein prior to coating the outer surface of the polymeric covering layer, the outer surface of the polymeric covering layer is cleaned and dried.

22. The method of claim 13, wherein curing of the liquid polymer resin occurs at a temperature from about 200° C. to about 320° C.

23. The method of claim 13, wherein coating of the outer surface of the polymeric covering layer and curing of the liquid polymer resin are automated.

24. The method of claim 13, wherein the non-extruded coating layer has a thickness of about 5 mils or less.

25. The method of claim 13, wherein the polymeric covering layer is an insulation layer or a jacket layer for the cable.

26. The method of claim 13, wherein the one or more conductors comprise a plurality of insulated conductors.

27. The method of claim 26, wherein the polymeric covering layer covers the plurality of insulated conductors.

* * * * *